United States Patent [19]
Kilmer

[11] Patent Number: 5,623,149
[45] Date of Patent: Apr. 22, 1997

[54] HIGH FIDELITY DUAL SOURCE SOLAR SIMULATOR

[75] Inventor: Louis C. Kilmer, Torrance, Calif.

[73] Assignee: The Aerospace Corporation, El Segundo, Calif.

[21] Appl. No.: 388,329

[22] Filed: Feb. 14, 1995

[51] Int. Cl.$^6$ .................................................. G01J 1/00
[52] U.S. Cl. ................................. 250/495.1; 250/504 R
[58] Field of Search ............................ 250/493.1, 495.1, 250/504 R

[56] References Cited

U.S. PATENT DOCUMENTS

| | | | |
|---|---|---|---|
| 4,125,775 | 11/1978 | Chodak | 250/504 |
| 4,408,825 | 10/1983 | Stelmack | 350/1.7 |
| 4,641,227 | 2/1987 | Kusuhara | 362/231 |
| 4,789,989 | 12/1988 | Stern et al. | 350/96.18 |
| 5,111,329 | 5/1992 | Gajewski et al. | 359/275 |
| 5,214,494 | 5/1993 | Inaba et al. | 356/419 |
| 5,217,285 | 6/1993 | Sopori | 362/1 |
| 5,282,121 | 1/1994 | Bornhorst et al. | 362/294 |

OTHER PUBLICATIONS

JPL Publication 82–69, "Solar Cell Radiation Handbook" Third Edition NASA pp. 2–2, 2–4, 2–5, 2–6 no date.
G. F. Virshup, B. C. Chung, M. L. Ristow, M. S. Kuryla, D. Brinker "Temperature Coefficients of Multijunction Solar Cells" Proceedings of the 21st IEEE PVSC (1990) pp. 336–338 no month.
Oriel Corporation, Solar Simulation Catalog, 1992 p. 31 no month.
D. B. Bickler, "The Calibration of a Solar Simulator" Proceedings of the ASME Solar Energy Applications Committee Winter Annual Meeting (1962), paper No. 62–WA–240. no month.
D. B. Bickler, "The Simulation of Solar Radiation", Hoffman Electronics Corporation, Semiconductor Division, Internal Documentation. no date.
M. Bennett, R. Podlesny, "Two Source Simulator For Improved Solar Simulation", Proceedings of the 21st IEEE PVSC (1990) no month pp. 1448–1432.
Y. Yan and K. Zhang, "Optical Coatings for the FY–1 Meteorological Satellite and Airborne Remote Sensing Instruments" *Optical Engineering* Feb. 1994, vol. 33, No. 2, pp. 643–646.
Schott Glass Technologies, Inc. "Color Filter Glass" pp. 1–13, 50, 51, 52, 56, 57, C8 no date.

*Primary Examiner*—Bruce C. Anderson

[57] ABSTRACT

A high fidelity dual source solar simulator that provides a higher fidelity spectral match to the Air Mass Zero (AM0) solar spectrum and is derived from ultraviolet (UV) and visual light from a xenon arc lamp which is band pass filtered by a hot reflective mirror and slope filtered by a color glass filter, with the infrared (IR) light from a tungsten lamp which is band pass filtered by a cold reflective mirror and slope filtered by a thin film filter, so that, when the xenon and tungsten light components are combined as spectral segments, the spectra of the simulator matches both the curve shape and integral energy of the AM0 spectra while attenuating optical spikes so as to provide high fidelity over the entire AM0 spectrum.

18 Claims, 5 Drawing Sheets

Dual Source Simulator

FIG. 1

FIG. 2
Dual Source Simulator

HIGH FIDELITY DUAL SOURCE SOLAR SIMULATOR

STATEMENT OF GOVERNMENT INTEREST

The invention was made with Government support under Contract No. F04701-93-C-0094 by the Department of the Air Force. The Government has certain rights in the invention.

The invention described herein may be manufactured and used by and for the government of the United States for governmental purpose without payment of royalty therefor.

FIELD OF INVENTION

The present invention relates to solar simulators. More specifically, the present invention relates to Air Mass Zero dual source solar simulators.

BACKGROUND OF THE INVENTION

Present day space solar cells require that accurately calibrated precision equipment be used for tests and measurements of the solar cells prior to operational use. During testing of the solar cells, an important testing device is the light source which is used to simulate solar radiation upon solar cells during testing. Advanced solar cells are extremely sensitive to the spectral content of the incident light. Therefore, it is necessary to test the solar cells under a light with spectral characteristics similar to those of the sun in space defined as the well known Air Mass Zero (AM0) solar spectra. The use of a well matched AM0 spectra is particularly important for testing multi-junction solar cells which have irregular performance output over the solar spectral bandwidth.

Energy integration of the solar spectra over the complete spectral bandwidth of 0 to 1.0 meters in wavelength, yields a solar energy constant of 135.3 mW/cm$^2$. Energy integration of the solar AM0 spectra over an effective operational bandwidth range of 250–2400 nm wavelengths, yields an energy constant of 129.27 mW/cm$^2$, which is 95.5% of the total integral solar energy. A scaled irradiation spectrum for a 5800K blackbody is approximately equal to the integral solar energy over the 250–2400 nm wavelength range. That is, the solar spectral curve shape at one astronomical unit, the earth to sun distance, is approximated by an intensity scaled 5800K blackbody. A 3200K blackbody irradiation spectrum, the spectrum of a tungsten source, with nearly equally scaled integral energy over the 250–2400 nm wavelength range, does not match the solar spectral curve. As the temperature of a blackbody decreases, the peak energy decreases in intensity and shifts towards longer wavelengths. Thus, a cooler blackbody spectrum has a greater portion of energy in the infrared (IR). This spectral mismatch is well known as early solar simulators used only tungsten sources. Variations between different blackbody spectra are also important when considering the use of a tungsten source to match the IR portion of AM0. The tungsten source, while providing equally scaled integral energy matching over the entire 250–2400 nm wavelength range, disadvantageously has lower energy levels in the UV and visual 250–900 nm range and higher energy levels in the near IR and IR 900–2400 nm range. Hence, the tungsten source is not a good single source solar simulator.

Conventional solar simulators have been based on xenon arc lamps having high energy levels in the UV, visual and near IR ranges and lower energy levels in the IR ranges as compared to the tungsten source. Testing of solar cells has been done using xenon arc lamps. Xenon arc lamps are known to have a nearly constant intensity throughout the visible portion of the spectrum. The xenon arc lamps are also known to disadvantageously have several high intensity spikes, particularly between 700 and 1100 nm wavelengths, for example, the xenon arc lamp used in a prior art XT-10 xenon solar simulator. The high pressure xenon arc lamps have several high intensity spikes of energy which can greatly affect solar cell measurements. The presence of high intensity spikes in a solar simulator spectrum can cause significant variations between terrestrial test solar cell measurements and actual performance in space. The high intensity spikes can cause erroneous performance measurements of single-junction and multi-junction solar cells caused by varying temperature coefficients due to the semiconductor band gap and absorption variations with temperature. There has been a great deal of effort aimed at filtering the xenon arc lamp spectra to better match the AM0 spectrum by removing the high intensity spikes, but their complete elimination has been largely unsuccessful. Despite the great deal of effort that has been directed toward reducing the intensity of the xenon spikes through optical filtering, spike elimination has not been successful resulting in low spectral fidelity.

Several xenon arc lamp solar simulators have been developed but have either high intensity spikes or mismatch to the AM0 spectrum, or both. The spectral intensity of a Large Area Pulsed Solar Simulator (LAPSS) as a function of wavelength has poor solar spectra matching. The LAPSS has fewer high intensity spikes than the XT-10. However, the general shape of the LAPSS spectral curve does accurately match the AM0 spectrum. An Oriel xenon arc lamp solar simulator with an AM0 filter better matches the solar spectrum. However, the Oriel solar spectra has several high intensity spikes. A Spectrolab X-25 solar simulator has only one high intensity spike over the 300–1100 nm wavelength range. The spectrum of the X-25 over a wider wavelength range has several high intensity spikes beyond 1100 nm that can affect solar cell measurements. The single xenon source X-25 solar simulator has improved performance over the 300–1100 nm range, but uses 19 different filters aimed at both reducing the high intensity spikes and providing a uniform large area illumination spot size. While the X-25 has several high intensity spikes, the general shape of the curve nearly matches that of AM0. The X-25 has been widely used throughout the space solar cell testing community.

Prior art spectral measurements have been made using silicon photodiode detectors that are only sensitive to light in the 300–1100 nm range. In the past, this was an adequate measurement of a solar simulator since most solar cells being tested were also made from silicon. Therefore, a solar simulator only had to match a limited portion of the AM0 solar spectrum. Some advanced solar cells use lower band gap materials which are sensitive to a larger portion of the solar spectrum and therefore increase the solar spectra matching requirements of a more accurate solar simulator. In particular, triple-junction solar cell designs have included active Ge junctions which absorb light having wavelengths up to 1880 nm.

Figure 1:
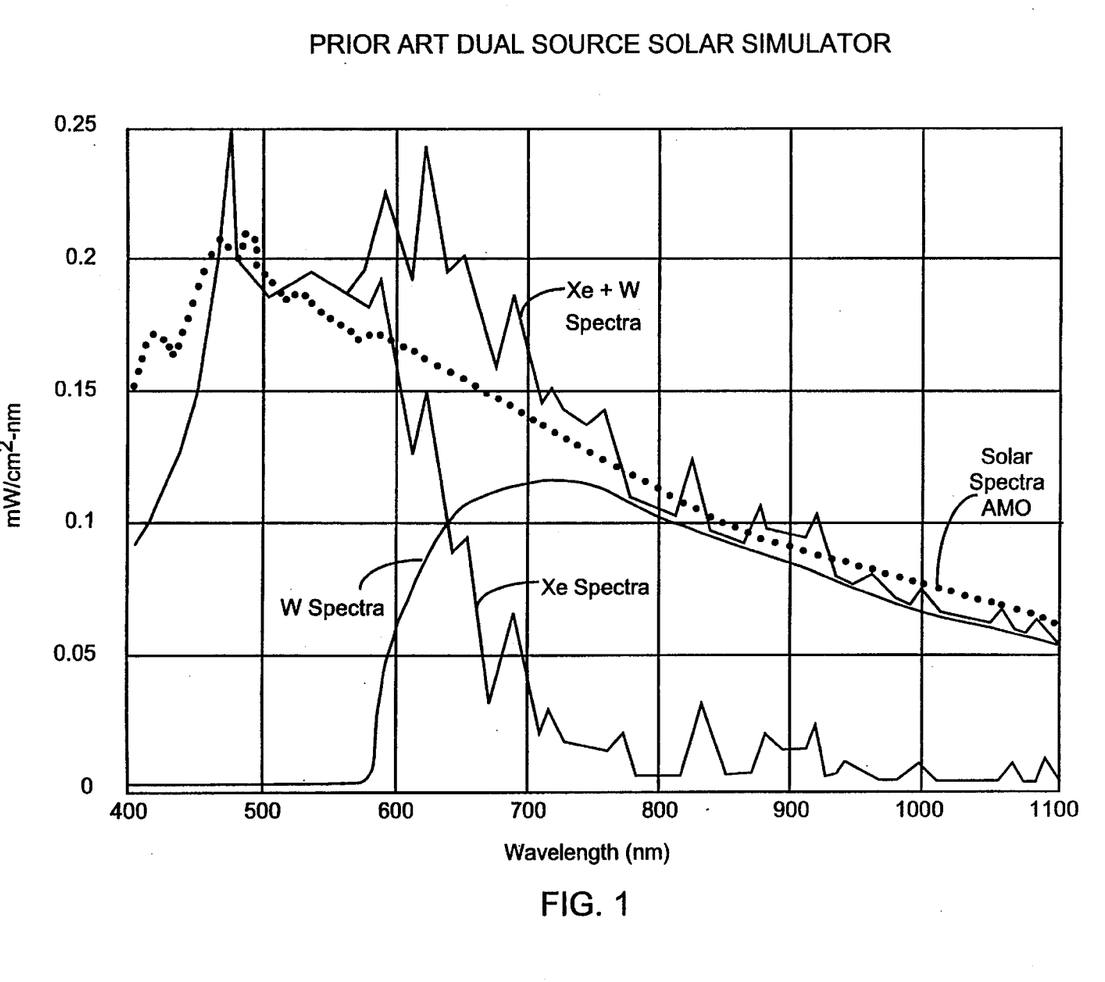
FIG. 1 is a spectral plot of a prior art xenon spectral and tungsten spectral components and as summed as a dual source solar simulator, and as compared to the AM0 solar spectra.

A prior art Hoffman dual source solar simulator uses a xenon arc lamp to match the ultraviolet (UV) and visual portions of the AM0 spectrum and a tungsten lamp to match the near IR and IR portions. This prior art dual source simulator was designed to match the solar spectral irradiance as earlier defined but which differs slightly from the presently accepted AM0 measurements. This prior art Xe-W (xenon and tungsten) dual source solar simulator was developed to provide a better match to the AM0 spectrum by taking advantage of the UV and visual spectra of the xenon arc lamp and the near IR and IR spectra of the tungsten lamp. However, this prior art Xe-W dual source solar simulator does not completely remove the high intensity spikes of the xenon arc lamp and provides poor spectral matching over the entire 250–2400 nm wavelength range. Problems with this prior art Xe-W dual source solar simulator are better understood by reference to FIG. 1. It is important to compare the prior art Xe-W dual source solar simulator to the AM0 spectra. FIG. 1 depicts the AM0 solar spectra compared to the spectrum of the prior art Xe-W dual source solar simulator having the Xe, W and Xe+W summation spectra. Energy intensity is normalized to wavelength in nanometers (nm). FIG. 1 shows the measured spectral intensity of the prior art xenon and tungsten dual source solar simulator as the Xe+W summation spectra and is compared to the AM0 spectra. The simulator spectra Xe+W summation has too much energy in the visible portion (500–700 nm), but matches AM0 very well in the IR. In addition, there are disadvantageously significant high intensity spikes beyond 600 nm wavelengths.

This prior art dual source simulator uses absorbing color glass filters to respectively isolate the xenon spectral component and the tungsten spectral component. The light from the tungsten source is filtered through a red lens which passes only visible and IR light. The light from the xenon source is filtered through a blue lens which passes only the UV and visible light. The simulator allows for easy measurement of the separate blue and red portions of the spectrum by simply blocking the respective lens with an opaque cover. FIG. 1 shows the separately measured xenon (Xe) blue spectral component and the tungsten (W) red spectral component. It is evident that the excess energy in the visible portion of the simulator spectrum is caused by the summation of the two components between 600–700 nm wavelengths. Additionally, the turn on of the pass band absorption edge curve of the tungsten source at about 575 nm and the turn off of the pass band absorption curve of the xenon source at about 675 nm are not ideally matched providing a high Xe-W summation level therebetween. Also, the filtering of the xenon light is not complete and several of the high intensity spikes are apparent in the measured Xe+W summation spectra. The far IR is not shown in the measured spectrum due to the limitations of the silicon photodetector, but other measurements have shown that the dual source solar simulator has too much energy beyond the 1100 nm wavelength. This is an expected function of the tungsten source, a 3200K blackbody, and the red color glass filter. Therefore, very low band gap materials, such as an active Ge junction in a GaAs/Ge solar cell or a $GaInP_2$/GaAs/Ge triple junction cell, would produce more measured current when illuminated by the solar simulator than under solar illumination in space. Another problem with the prior art Xe-W dual source solar simulator is the over heating of the color glass filters which absorb light energy when filtering unwanted spectral components leading to over heating and premature failure of the color glass filters.

Integral energy is used to give a quantitative measure of matching of the solar simulator to the AM0 standard. The integral energy is measured in discrete energy bins of narrow bandwidth segments over the entire bandwidth range for comparison between the solar simulators and the AM0 standard. Integral energy data for AM0 has been compared to the X-25 solar simulator. The X-25 solar simulator is fairly accurate over a wide wavelength range when measured in large energy bins. The integral energy data for AM0 has also been compared to the measured dual source solar simulator of FIG. 1. The dual source solar simulator has significantly lower energy in the 400–450 nm wavelength range and significantly extra energy in the 600–700 nm wavelength range.

Presenting the spectral data by only integral energy conceals the presence of high intensity spikes. The fidelity of the solar simulator refers to the smoothness of the spectral curve over very small wavelength ranges. A low fidelity solar simulator may have many high intensity spikes in its spectral output even though the integral energy and general shape of the spectrum may closely match the AM0 spectra. Therefore, both spectral intensity plots and the integral energy values must be considered when accurately comparing solar simulators to the AM0 spectra. This is particularly evident when comparing the X-25 and the prior art dual source simulators to the AM0 spectra. Each simulator has advantages while neither is ideal. The X-25 matches the AM0 spectra when comparing integral energy bins but has high intensity spikes. The dual source simulator has removed most of the xenon high intensity spikes but has an unbalanced integral energy profile.

A terrestrial AM1.5 dual source solar simulator has also been used. This design also uses a xenon arc lamp but with a "cold" mirror that reflects the UV and visual "cold" wavelength segments of the spectrum, closest to visual blue colors, and uses an incandescent source with a hot mirror that reflects the IR or "hot" wavelength segments of the spectrum, closest to visual red colors, respectively for cold and hot spectral segment matching to the AM1.5 spectra. However, there are imperfections in the hot and cold mirrors. In particular, the intensity of the xenon source is not completely filtered beyond the turn off wavelength of about 700 nm due to slight reflectivity in the infrared. The high intensity spikes are substantially reflected off of the cold mirror, but portions of the spikes are transmitted through the cold mirror and are apparent in the combined spectrum. While there are no very high intensity spikes remaining in the combined spectrum, the remaining smaller spikes are still a problem for accurate solar cell performance measurements. This terrestrial dual source solar simulator is not a significant improvement over the X-25 or prior art Xe-W dual source solar simulators.

Hence, there exists a continuing need for an improved solar simulator having a simulated spectra which matches the AM0 solar spectra, which provides the same integral energy, which removes unwanted intensity spikes, and which does not suffer from color glass filter over heating nor the use of respective spike filters to remove specific intensity spikes. These and other disadvantages are solved or reduced using the present invention.

SUMMARY OF THE INVENTION

An object of the present invention is to provide a solar simulator having improved integral energy, solar spectra shape matching and fidelity over a solar spectrum.

Another object of the present invention is to provide a solar simulator having multiple sources with respective band pass and slope filtering providing respective solar spectral components which are combined as spectral segments to form a simulated solar spectra.

Yet another object of the present invention is to provide a xenon and tungsten dual source solar simulator having improved integral energy matching, improved solar spectra curve matching and higher spectral fidelity over the solar spectra with each source having respective band pass and curve filtering providing two respective spectral segments which are combined to form a simulated solar spectra.

Still another object of the present invention is to provide a xenon and tungsten dual source solar simulator having improved integral energy matching, improved solar spectral shape matching and higher spectral fidelity over a solar spectrum with each source having respective reflective mirror band pass filtering and respective curve shaping filtering providing an ultraviolet-visual solar spectral segment and a near-infra-red and infra-red solar spectra segment, respectively, which are combined to form the simulated solar spectra.

Still a further object of the present invention is to provide a xenon and tungsten dual source simulator having improved integral energy matching, improved solar spectral shape matching and higher spectral fidelity over the solar spectrum with the xenon source having reflective hot mirror band pass filtering and the tungsten source having a reflective cold mirror band pass filtering, each having a respective slope filter, respectively providing an ultraviolet-visual solar spectral segment and a near-infra-red and infra-red solar spectral segment, both of which are combined to form the simulated solar spectra.

The present invention covers a high fidelity multiple source solar simulator having respective band pass and slope filtering for each source used to provide a segment of the composite simulated solar spectra. Separate filtering of the individual sources is used to provide the necessary transmission function. The spectral output of the sources are respectively filtered providing respective spectral segments which are summed, onto a point to provide the composite simulated solar spectra. It has been discovered that various transmission filter functions can be used and discovered that the required transmission function of the filters can not be met with a single conventional filter. In the preferred form of the invention, a xenon arc lamp with a hot reflective mirror band pass filter and a first color glass slope filter provide a low wavelength spectral segment of the solar spectra while a tungsten lamp with a cold reflective mirror band pass filter and a second color glass slope filter provide a high wavelength spectral segment of the simulated solar spectra. In the preferred form, the first color glass filter is used to both change the spectral curve shape of the xenon UV spectrum and to reduce the magnitude of the high intensity spikes in the visible and IR wavelengths. In another preferred embodiment, the second color glass filter is replaced with a thin film filter and is used to meet the required transmission function in the far IR portions of the tungsten light. In both preferred forms, the combined filtered simulated spectra provides a more accurate solar simulator with matching spectral curve distribution and matching integral energy to the AM0 spectra over the entire solar spectral range while completely removing the high intensity xenon arc lamp spikes to improve spectral fidelity.

The accuracy of a solar simulator is improved in both the general shape of the spectral curve and the integral energy of the simulator in comparison to that of the AM0 spectrum. The high fidelity solar simulator does not have high intensity spikes and better matches the AM0 spectrum at all wavelengths. For each solar segment, xenon (Xe) or tungsten (W), one band pass filter and one slope filter is used, as the present invention does not use one filter for each spike attenuated. The present invention uses hot and cold reflective mirror filters which do not over heat by optical absorption. The slope filters provide spectral intensity curve shaping and further attenuate the high intensity spikes which might otherwise appear outside the respective spectral segment through imperfect band pass mirror filtering. These and other advantages will become more apparent in the following detailed description of the preferred embodiment.

DETAILED DESCRIPTION OF THE PREFERRED EMBODIMENT

Figure 2:
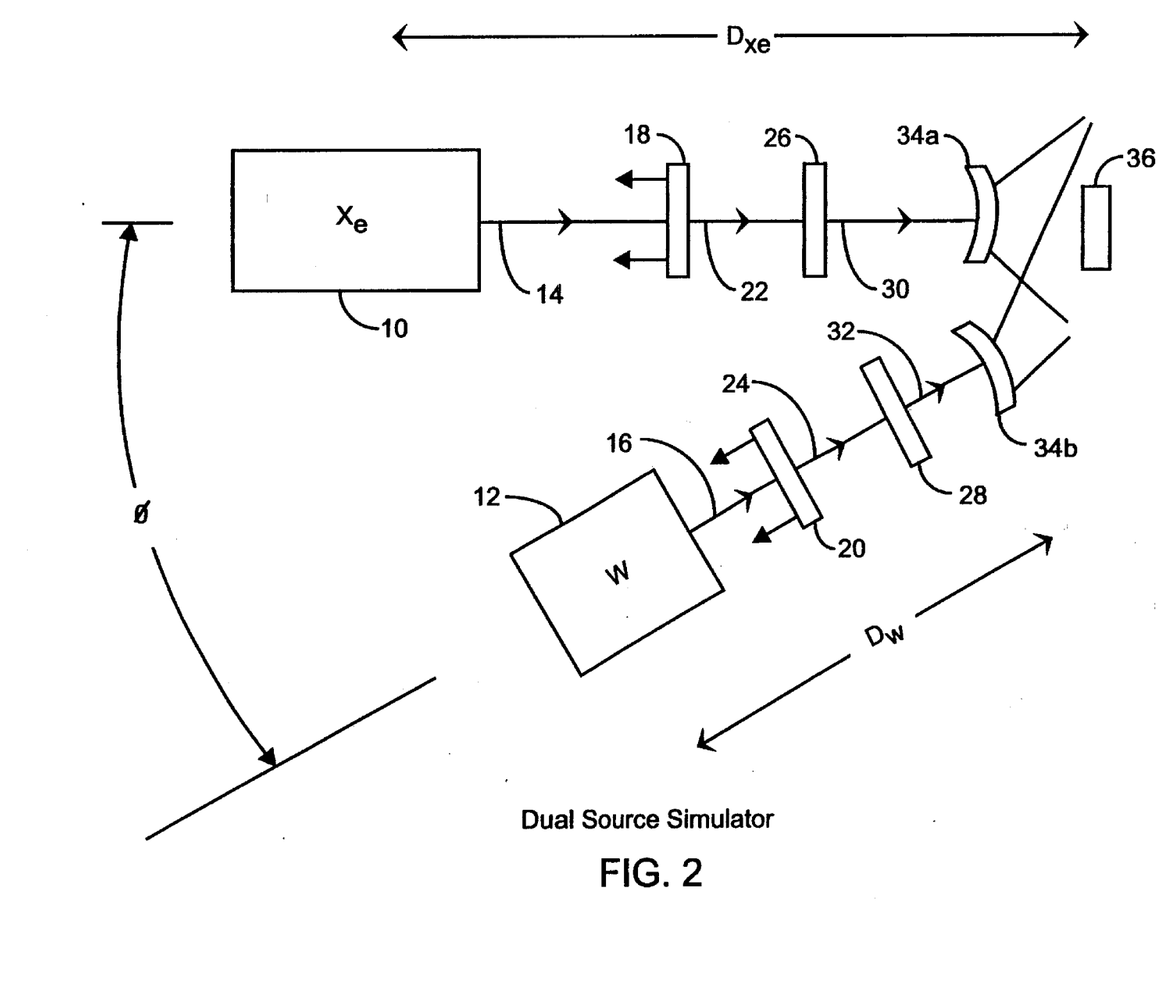
FIG. 2 is a block diagram of the dual source simulator of the present invention.

The high fidelity dual source solar simulator of the present invention is shown in FIG. 2 and is used to generate an Air Mass Zero (AM0) solar spectra as that found in outer space at one astronomical unit. The simulator accurately matches the integral energy and curve shape of the AM0 solar spectra without high intensity spikes which are removed by optical filtering. The dual source solar simulator uses a high intensity xenon arc lamp 10 and a high intensity tungsten lamp 12. The xenon arc lamp 10 provides an unfiltered xenon arc lamp spectra 14 and the tungsten lamp 12 provides an unfiltered tungsten lamp spectra 16. The xenon spectra 14 and tungsten spectra 16 may be normalized to wavelengths specified in nanometers (nm). The tungsten spectra 16 is very similar to a 3200K blackbody and a calculated spectrum may be used for design verification in the far infrared beyond the silicon photodetector measurement capabilities. The xenon spectra 14 is characterized as having a relatively constant energy intensity between 400 nm to 800 nm with large intensity spikes between 800 and 1000 nm and smaller intensity spikes extending beyond 1000 nm.

The xenon spectra 14 is band pass filtered by a "hot" mirror 18 and the tungsten spectra 16 is band pass filtered by a "cold" mirror 20. The mirrors 18 and 20 provide a band pass filtered xenon spectra 22 and band pass filtered tungsten spectra 24, respectively, which are further filtered by transmission filters 26 and 28, respectively. The filters 26 and 28 respectively provide a xenon spectral segment 30 and a tungsten spectral segment 32 which are respectively focused by lenses 34a and 34b which combine and focus the spectral segments 30 and 32 onto a point which may be an a solar cell 36. The angle of incidence, theta, is preferably as small as practicable to provide near normal incidence of simulated solar radiation onto the solar cell 36. The distances $D_{xe}$ and $D_w$ are set to normalize the energy intensity of the spectral segments 30 and 32 onto the solar cell 36. The xenon arc lamp 10 is preferably an Oriel model number 81192, 1000 Watt, xenon arc lamp. The tungsten lamp 12 is preferably an Oriel model number 6315, 1000 Watt, quartz tungsten halogen lamp. The hot mirror 18 is preferably an OCLI stock wide band hot mirror. The cold mirror 20 is preferably an OCLI stock wide band cold mirror. The transmission filters 26 and 28 are preferably Schott KG4 and KG3 color glass filters, respectively.

Those skilled in the art of optics would know how to select distances $D_{xe}$ and $D_w$ and lenses 34a and 34b for matching illumination intensity upon and focal distances to the solar cell 36. While the preferred design uses an angle theta to combine Xe and W spectral segments 30 and 32, other optical techniques may be used as well. For example, theta may be ninety degrees providing orthogonally aligned spectral segments 30 and 32, which may be combined by a fortyfive degree reflective-transmissive mirror. These optical techniques are well known by those skilled in the art of optics.

In order to combine the spectral segments 30 and 32 together to form the simulated AM0 solar illumination, the source spectra 14 and 16 must be band pass filtered to reflect unwanted portions and transmit appropriate portions. Optical Coating Laboratory Inc. provides wide band hot and cold band pass mirrors which are characterized at normal incidence. The purpose of the hot mirror 18 is to pass 400–750 nm spectra while filtering the remainder spectra preferably by reflection so as to limit unwanted heat absorption and premature failure of the hot mirror filter 18. The hot mirror 18 is used for band pass filtering to transmit 400–750 nm UV and visual spectral portions while reflecting 800–1200 nm visible and near IR spectral portions of the xenon arc lamp spectra 14. However, available hot mirrors disadvantageously transmit beyond 1200 nm which would pass unwanted xenon arc lamp high intensity spikes. Other hot mirrors or a combination of mirrors could be used to filter by reflection spectral portions extending beyond 1200 nm. The purpose of the cold mirror 20 is to pass near IR and IR 750–2400 nm spectral portions while filtering the remaining spectrum particularly between 400–750 preferably by reflection so as to also limit unwanted heat absorption and premature failure of the cold filter mirror 20. The cold mirror 20 is used to filter by reflection 400–750 nm UV spectral portions of the tungsten spectra 16 while passing 750–2400 nm spectral portions.

Figure 3:
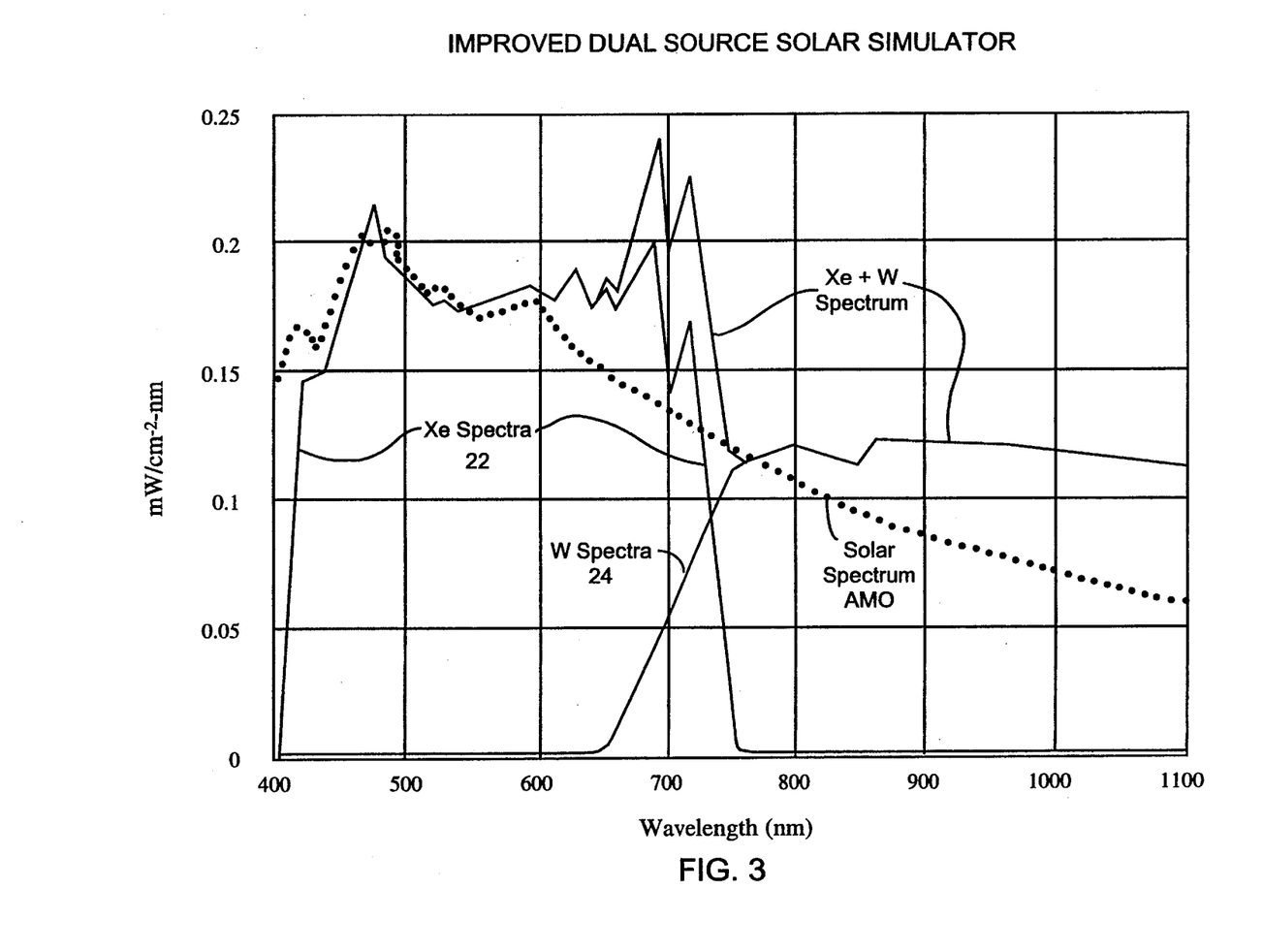
FIG. 3 is a spectral plot of the xenon spectral and tungsten spectral components and as summed but without transmission filtering, and as compared to the AM0 solar spectra.

The transmitted xenon (Xe) spectra 22 of the xenon arc lamp 10 through the hot mirror 18 has been calculated and is shown in FIG. 3. The transmitted tungsten (W) spectra 24 of the tungsten lamp 12 through the cold mirror 20 has been calculated and is also shown in FIG. 3. Also shown in FIG. 3 is the AM0 solar spectral reference as well as the Xe+W summation spectra of the transmitted spectral components 22 and 24. Referring to FIGS. 2 and 3, between about 750–1100 nm, there are no high intensity spikes in the Xe+W summation. The Xe+W summation of the spectral components 22 and 24 has a relatively flat spectral curve between 400–750 nm mostly provided by the spectra 14 of xenon arc lamp 10. The 400–750 nm Xe+W curve has increased energy near 750 despite spectral attenuation near 750 nm provided by the hot mirror 18. There is also a relatively flat spectral curve between 750–1100 nm and beyond provided by the spectra 16 of the tungsten lamp 12 as filtered by the cold mirror 20.

The Xe+W spectra beyond 1100 nm wavelength, where the hot 18 mirror begins to transmit again, would also include high intensity spikes, not shown, from the xenon arc lamp 10. Imperfections of the cold mirror 20 cause less than total transmission beyond the 700 nm turn on wavelength and a reduction in tungsten intensity in the 750–850 nm range. This tends to flatten tungsten spectral components and therefore flatten the Xe+W summation spectra beyond 750 nm. The two relatively flat spectral portions 400–750 nm and 750–1100 nm of the Xe+W summation spectra do not match the AM0 solar spectra, as shown in FIG. 3. The summation of the Xe+W spectra after hot and cold mirror filtering have too much energy above the AM0 spectrum in both of the 400–750 nm and 750–1100 nm spectral segments. The Xe+W summation spectra particularly has too much energy near 700 nm as well as too much energy beyond 900 nm as compared to the AM0 spectrum, as shown. Thus, Xe+W summation spectra has too much integral energy in the visible and IR portions and does not follow the general curve shape of the AM0 spectra.

Figure 4:
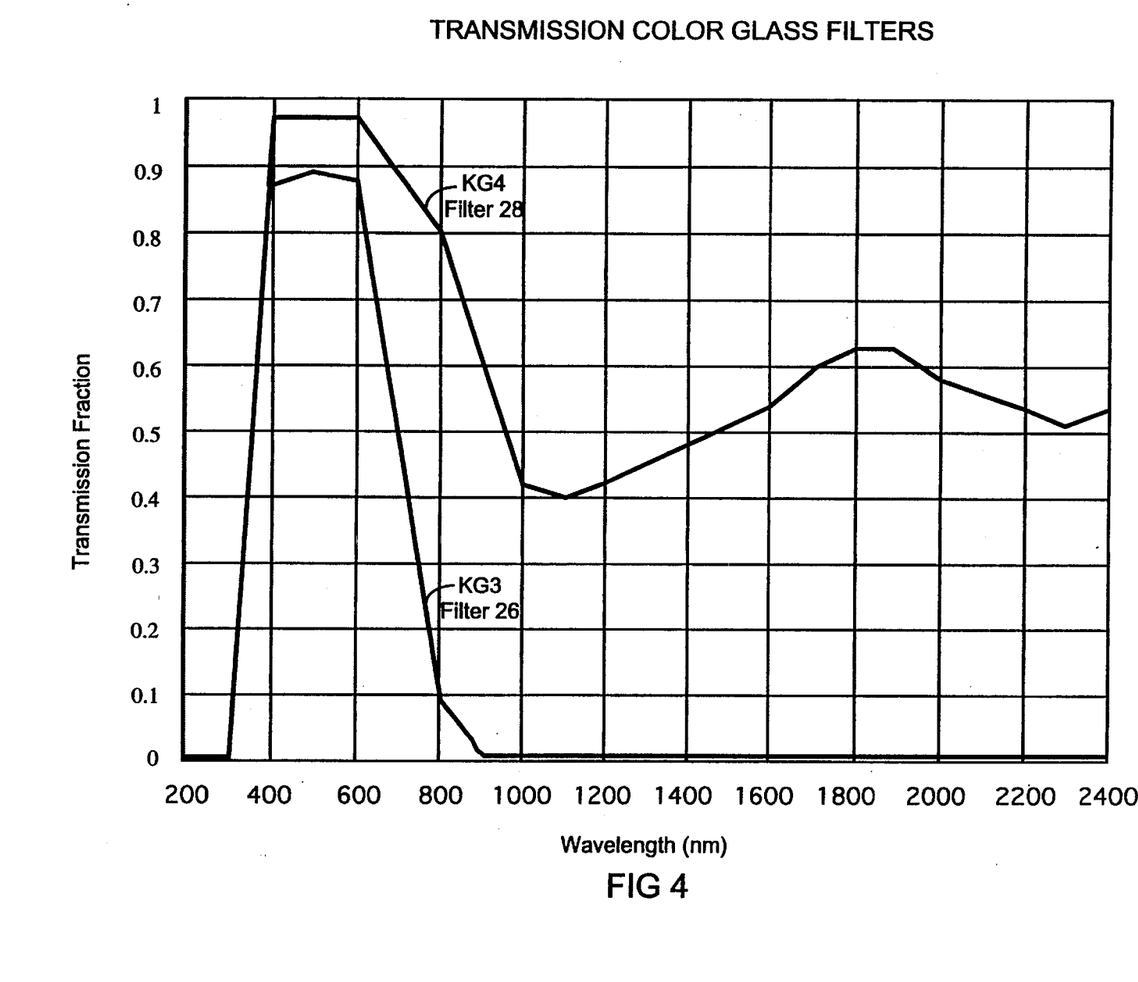
FIG. 4 is a transmission function plot of the KG3 and KG4 color glass filters.
Figure 5:
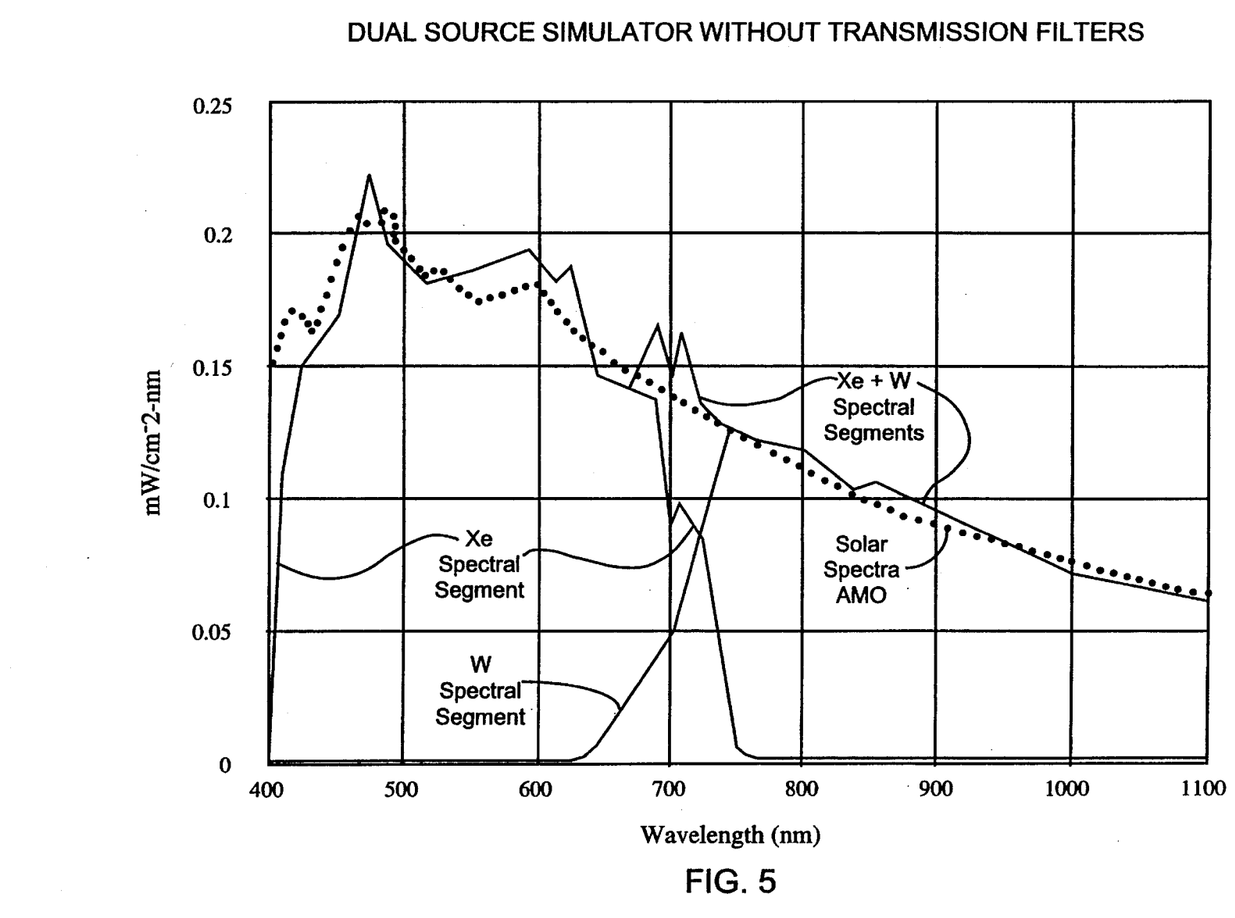
FIG. 5 is a spectral plot of the xenon spectral and tungsten spectral components and as summed as the dual source solar simulator, and as compared to the AM0 solar spectra.

Additional filtering is used to remove all the xenon arc lamp high intensity spikes, even those extending beyond the 1100 nm wavelength range, as well as shaping the Xe and W spectral segments to more closely match the curve shape and integral energy of the AM0 spectra. The dual source solar simulator of FIG. 2 uses transmission filters 26 and 28 for spectral curve shaping and additional filtering to modify the curve of the Xe+W summation spectra by filter attenuation so as to match the AM0 spectra. The transmission filter 26 filters the xenon spectra component 22 and the transmission filter 28 filters the tungsten spectra component 24. FIG. 4 shows the transmission function of KG3 and KG4 stock Schott color glass filters which may be used as filters 26 and 28, respectively. FIG. 5 shows the high fidelity dual source solar simulator spectrum of the present invention having a xenon (Xe) spectra segment between 400 nm and 750 nm substantially provided by the xenon arc lamp 10, hot mirror 18 and the KG3 color glass filter 26, and having a tungsten (W) spectra segment between 750 nm and 1100 nm substantially provided by the tungsten lamp 12, the cold mirror 20 and the KG4 color glass filter 28.

The filters 26 and 28 are similar to hot mirrors in that they only substantially transmit in the UV and visible portions of the optical spectrum. The filters 26 and 28 have a near linear fall off in transmission in the near IR and have a relatively constant transmission in the far IR. These linear fall off and constant transmission characteristics are used for curve shaping of the xenon and tungsten spectra components 22 and 24 for improved solar spectral matching. The KG3 filter 26 attenuates the intensity of the xenon spectra component 22 in the visible portion of the spectrum to better match the slope of the AM0 spectrum. The transmission of the KG3 color glass filter 26 is less than 0.01 beyond 1000 nm, which also almost completely eliminates by additional filtering any high intensity spikes of the xenon arc lamp 10 in the IR spectral portion. The linear fall off the KG4 color glass transmission filter 28 attenuates the tungsten spectral component 24 between 600 and 1000 nm. Additionally, the less than perfect relatively constant transmission function of the filter 28 attenuates the tungsten spectra between 1000 and 2400 nm.

The xenon (Xe) spectral segment 30 from of the xenon arc lamp 10, wide band hot mirror 18 and Schott's KG3 color glass filter 26 is shown in FIG. 5. The tungsten (W) spectral segment 32 from the tungsten lamp 12, wide band cold mirror 20 and Schott's KG4 color glass filter 28 is also shown in FIG. 5. The Xe+W spectral segment summation as well as the AM0 solar spectra are also shown for comparison. As is now apparent, the curve shaping attenuation of the color glass filters 26 and 28, in addition to the band pass filtering of mirrors 18 and 20 provide better spectral matching between the Xe+W summation spectra of the solar simulator and the AM0 solar spectra as a function of wavelength. As shown, there still remains two very small spikes in the visible portion of the spectrum, but the simulator spectra energy is very well matched to the AM0 spectrum over the 400–1100 nm range. The complete dual source solar simulator spectra between 400–1100 nm of the present invention provides better spectral curve shape matching, integral energy matching and high fidelity with the elimination of the very high intensity spikes. However, the transmission of the color glass filter 28 increases in the far IR and causes the tungsten spectral segment 32 of the Xe+W summation of dual source solar simulator to again have too much energy beyond 1100 nm wavelengths.

The above preferred embodiment provides an accurate solar simulator over the 400–1100 nm range. The hereinabove preferred embodiment uses stock commercial xenon and tungsten lamps, the hot and cold mirrors, and the color glass filters. However, the spectral transmission functions of the individual components are not ideal. In particular, the commercial hot mirror 18 has nearly zero transmission between 350 nm to 400 nm. Most solar cells 36 are sensitive to light in this wavelength region. The solar cells 36 used for space are part of an assembly using adhesives and cover glasses which have anti-reflection coatings. These coatings reflect all incident energy below 350 nm to prevent the adhesives from darkening. The reduction in energy in the UV 350–400 nm range is not presently that critical, even though low solar intensity in the UV 350–400 nm range is present. A custom hot mirror may be used to provide transmission down to 350 nm, but not without significant changes in performance and cost.

The solar simulator of the present invention has low energy in the 400–450 nm energy bin due to the commercial hot mirror transmission function. The actual energy integral difference is small at about 1.86 mW/cm$^2$ amount of integral energy which is less than 1.4% of the total AM0 integral energy. The reduced intensity in the 350–400 nm range caused by the transmission function of the commercial wide-band hot mirror requires a specific hot mirror design. However, simulator intensity below 350 nm is not as important because most solar cells are placed under cover glasses which are coated to reflect the light with wavelengths less than 350 nm. Changing the mirror design to allow transmission in the low UV will alter the transmission function over the entire wavelength range.

A major limitation in the preferred dual source solar simulator design is the additional energy in the IR between 1100 nm and 2400 nm. Most solar cells do not absorb light in the far IR wavelengths. Active Ge in GaAs/Ge or GaInP$_2$/GaAs/Ge multi-junction solar cells will require a solar simulator that is accurate to at least 1880 nm. Therefore, a different filter design is required. A dielectric/metal thin film filter may be alternatively used, instead of KG4 filter 28, to provide an enhanced transmission function for further filtering the tungsten spectral component 24. This thin film filter may consist of multiple thin films. The dielectric metal thin film filter may be made of 1.96 nm of Ag, 39.9 nm of ZnS, 8.2 nm of Ag, and 5.32 nm of ZnS, thin films deposited on a silicon dioxide substrate. The transmission function can be theoretically calculated using a commercial Film Star lens design program. The transmission function resembles a blackbody curve having increasing attenuation towards the far IR. Such a thin film filter can be commercially developed without greatly increasing the system cost. Using the thin film filter instead of the KG4 color glass filter 28 reduces the far IR portion of the tungsten spectral segment 32 to produce a dual source solar simulator with spectral characteristics that better the AM0 solar spectra in the IR portion between 1100 nm and 2400 nm. This thin film filter provides curve shaping for accurately matching the tungsten spectral segment 32 to the AM0 IR spectral portion.

The high fidelity dual source solar simulator of the present invention also eliminates the high intensity spikes associated with xenon arc lamps and matches the spectral energy content and curve shape of AM0 by the combination of wavelength selective mirrors and optical filters. The preferred embodiment uses standard, off-the-shelf products to reduce both the cost and complexity of the system. New dielectric metal thin film filters may be used for enhanced performance. This filter is a unique contribution to the system and provides spectral matching to the AM0 spectrum in both the near and far infrared regions, as there is an increased importance in matching the solar simulator far IR to the AM0 solar spectra.

While the preferred form of the present invention includes two separate filtering means for each lamp, the band pass filter and the curve shaping filter may be combined into a single filter. The simulator spectrum could be accurately matched to the AM0 spectrum using only two filters, one filter for each lamp. The band pass filtered spectral components 22 and 24 provide substantially flat spectral components between 400 and 750 nm for the xenon lamp and 750 and 1100 nm for the tungsten lamp, such that the transmission filters 26 and 28 function to slope the flat portions of the spectral curve to match the solar AM0 spectra. The filters 18, 20, 26 and 28 of the present invention do more than simply band pass filter segments of the solar spectra. These filters are used in the present invention to slope the curve of the spectral components to match the AM0 solar spectra. It should now become apparent that a variety of filters could be used to optically modify the curve slope of the xenon and tungsten spectral segments so as to match the solar spectrum AM0.

The above preferred solar simulator embodiment is characterized by a plurality of sources, for example two, each of which having an optical filter, which respectively may comprise two series aligned filters, each of which provide for band pass filtering and spectral slope shaping to create respective spectral segments which when combined simulate the AM0 solar spectra. While those skilled in the art may improve and enhance the preferred form, those improvements and enhancements may nonetheless fall within the spirit and scope of the following claims.

I claim:

1. A solar simulator for providing a solar spectra defined by a solar energy intensity curve over a solar bandwidth, said simulator comprising, a plurality of light sources providing a respective plurality of light source spectra each having a source energy intensity curve over a source optical bandwidth, and a plurality of respective optical filters for respectively band pass filtering and curve shape filtering each of said plurality of light source spectra and for providing a respective plurality of filtered spectral segments each having a filtered energy curve over a respective segment bandwidth, said filtered spectral segments summed together by incident illumination into said solar spectra illuminating a predetermined point.

2. The simulator of claim 1 wherein said plurality of sources are intensity adjusted by distal positioning from said point and are angularly offset from each other in optical alignment through said plurality of respective optical filters to direct said respective plurality of filtered spectral segments onto said point.

3. The simulator of claim 1 wherein said simulator further comprises optical means for combining said respective plurality of filtered spectral segments into optical alignment providing said solar spectra.

4. The simulator of claim 1 wherein, said plurality of sources is a xenon lamp and a tungsten lamp, and said respective plurality of filtered segment spectra respectively simulates a portion of said solar spectra between 400 and 750 nanometers of said solar bandwidth for said xenon lamp and simulates a portion of said solar spectra between 750 and 1100 nanometers of said solar bandwidth for said tungsten lamp.

5. The simulator of claim 1 wherein, said plurality of sources are an xenon lamp and a tungsten lamp, and said plurality of respective filters are a band pass hot reflective mirror and a first curve shaping transmission color glass filter for said xenon lamp, and a band pass cold reflective mirror and a second curve shaping transmission color glass filter for said tungsten lamp, said respective plurality of filtered segment spectra respectively simulates a portion of said solar spectra between 400 and 750 nanometer wavelengths of said solar bandwidth for said xenon lamp and simulates a portion of said solar spectra between 750 and 1100 nanometer wavelengths of said solar bandwidth for said tungsten lamp.

6. The simulator of claim 1 wherein, said plurality of sources are a xenon lamp and a tungsten lamp, and said plurality of respective filters are a band pass hot reflective mirror and a curve shaping transmission color glass filter for said xenon lamp, and a band pass cold reflective mirror and a thin film curve shaping transmission filter for said tungsten lamp, said respective plurality of filtered segment spectra respectively simulates a portion of said solar spectra between 400 and 750 nanometer wavelengths of said solar bandwidth for said xenon lamp and simulates a portion of said solar spectra between 750 and 2400 nanometer wavelengths of said solar bandwidth for said tungsten lamp.

7. A solar simulator for providing a solar spectra defined by solar energy intensity curve over a solar bandwidth, said simulator comprising, a xenon lamp providing a xenon spectra, a band pass hot reflective mirror for band pass filtering said xenon spectra into a filtered xenon spectra component between 400 and 750 nanometer wavelengths of said solar bandwidth, a first curve shaping transmission filter for curve shaping said filtered xenon spectral component into a xenon solar segment spectra, a tungsten lamp providing a tungsten spectra, a band pass cold reflective mirror for band pass filtering said tungsten spectra into a filtered tungsten spectra component between 750 and 1100 nanometer wavelengths of said solar bandwidth, a second curve shaping transmission filter for curve shaping said filtered tungsten spectra component into a tungsten solar segment spectra, and means for optically combining said xenon solar segment spectra and said tungsten solar segment spectra into said solar bandwidth between 400 and 1100 nanometers wavelengths illuminating a predetermined point.

8. The simulator of claim 7 wherein, said xenon lamp and said tungsten lamps are angularly off set from each other and are displaced from said point at different distances, and said means for optical combining said xenon solar segment spectra and said tungsten solar segment spectra is a pair of lens each respectively focusing said xenon solar segment spectra and said tungsten solar segment spectra onto said point.

9. The simulator of claim 7 wherein, said xenon lamp and said tungsten lamp provide respective xenon and tungsten spectra at ninety degrees angularly displaced from each other and said optical means comprises a forty-five degree transmission mirror for optically aligning said xenon solar segment spectra and said tungsten solar segment spectra onto said point.

10. The simulator of claim 7 wherein, said first curve shaping filter is a KG3 transmission color glass filter, said solar spectra is AM0, and said second curve shaping filter is a KG4 transmission color glass filter.

11. The simulator of claim 7 wherein, said first curve shaping filter is a KG3 transmission color glass filter, said solar spectra is AM0, and said second curve shaping filter is a thin film transmission filter.

12. The simulator of claim 7 wherein, said filter xenon spectra component has a xenon flat wavelength normalized intensity curve between 400 and 750 nanometer wavelengths and said first curve shaping filter slopes said xenon flat wavelength normalized intensity curve to simulate said solar spectral between said 400 and 750 nanometer wavelengths, and said filter tungsten spectra component has a tungsten flat wavelength normalized intensity curve between 750 and 1100 nanometer wavelengths and said second curve shaping filter slopes said tungsten flat wavelength normalized intensity curve to simulate said solar spectral between said 750 and 1100 nanometer wavelengths.

13. A method for simulating a solar spectrum, said methods comprising the steps of generating a first spectra, generating a second spectra, band pass and curve shape filtering said first spectra into a first solar segment, band pass and curve shape filtering said second spectra into a second solar segment, combing said first and second solar segments into said solar spectra.

14. The method of claim 13 wherein said filter steps comprises the steps of band pass filtering said first spectra into a first spectral component, band pass filtering said second spectral into a second spectral component, slope filtering said first spectral component into said first solar segment, and slope filtering said second spectral component into said second solar segment.

15. A method for simulating the solar spectrum, said methods comprising the steps of generating a xenon spectra, generating a tungsten spectra, band pass and curve shape filtering said xenon spectra into a first solar segment, band pass and curve shape filtering said tungsten spectra into a second solar segment, and combing said first and second solar segments into said solar spectra.

16. The method of claim 15 wherein said filtering steps comprise the steps of, band pass filtering said xenon spectra into a xenon spectral component, band pass filtering said tungsten spectra into a tungsten spectral component, slope filtering said xenon spectral component into said first solar segment, and slope filtering said tungsten spectral component into said second solar segment.

17. The method of claim 16 wherein, said first solar segment has a spectrum bandwidth between 400 and 750 nanometers wavelengths, and said second solar segment has a spectrum bandwidth between 750 and 1100 nanometers wavelengths.

18. The method of claim 16 wherein, said first solar segment has a spectrum bandwidth between 400 and 750 nanometers wavelengths, and said second solar segment has a spectrum bandwidth between 750 and 2400 nanometers wavelengths.

\* \* \* \* \*